(12) United States Patent
Utterback

(10) Patent No.: US 10,086,911 B2
(45) Date of Patent: Oct. 2, 2018

(54) METHOD AND DEVICE FOR CONNECTING ARTICLES TO TIE-DOWN CLEATS

(71) Applicant: Todd Utterback, Tampa, FL (US)

(72) Inventor: Todd Utterback, Tampa, FL (US)

( * ) Notice: Subject to any disclaimer, the term of this patent is extended or adjusted under 35 U.S.C. 154(b) by 0 days.

(21) Appl. No.: 15/499,492

(22) Filed: Apr. 27, 2017

(65) Prior Publication Data

US 2017/0313232 A1    Nov. 2, 2017

Related U.S. Application Data

(60) Provisional application No. 62/328,059, filed on Apr. 27, 2016.

(51) Int. Cl.
| | | |
|---|---|---|
| *B63B 21/20* | (2006.01) | |
| *B60P 7/08* | (2006.01) | |
| *B63B 21/04* | (2006.01) | |
| *E02B 3/24* | (2006.01) | |

(52) U.S. Cl.
CPC ............ *B63B 21/20* (2013.01); *B60P 7/0807* (2013.01); *B60P 7/0823* (2013.01); *B63B 21/04* (2013.01); *B63B 2021/203* (2013.01); *E02B 3/24* (2013.01)

(58) Field of Classification Search
CPC ...... B60P 7/0807; B60P 7/0823; B63B 21/20; B63B 21/04; B63B 2021/203; E02B 3/24
USPC ........................................................ 114/218
See application file for complete search history.

(56) References Cited

U.S. PATENT DOCUMENTS

| | | | | | |
|---|---|---|---|---|---|
| 314,813 | A | * | 3/1885 | Ferris | A45F 3/04 |
| | | | | | 24/481 |
| 3,094,755 | A | * | 6/1963 | Casanave | F16G 11/046 |
| | | | | | 114/230.2 |
| 4,685,500 | A | * | 8/1987 | Silvia | B63B 21/045 |
| | | | | | 114/218 |
| 5,327,844 | A | * | 7/1994 | Kress | B63B 21/045 |
| | | | | | 114/218 |
| 5,564,670 | A | * | 10/1996 | Dysarz | A01K 97/10 |
| | | | | | 248/224.7 |
| 5,826,531 | A | * | 10/1998 | Havnaer, Jr. | B63B 21/045 |
| | | | | | 114/218 |
| 6,223,670 | B1 | * | 5/2001 | Schulze | E02B 3/24 |
| | | | | | 114/218 |
| 7,603,960 | B1 | * | 10/2009 | Perry | B63B 21/04 |
| | | | | | 114/218 |

(Continued)

Primary Examiner — Eret C McNichols
(74) *Attorney, Agent, or Firm* — Porter, Wright, Morris & Arthur, LLP

(57) ABSTRACT

A connection device is provided for removably connecting an article to a tie-down cleat having a pair of opposed horns each with each horn having a free end. The articles can be ropes, straps, bungee cords, netting, covers, wraps, accessories, and the like. The connection device includes a body having a pair of horn openings each configured for receiving one of the opposed horns therein. The horn openings are coaxial and spaced apart a distance less than a distance between the free ends of the horns. At least a portion of the body is formed of an elastic material so that the body can be resiliently stretched for selectively inserting the opposed horns into the horn openings to secure the connection device to the tie-down cleat and resiliently stretched for selectively removing the opposed horns out of the horn openings to remove the connection device from the tie-down cleat.

20 Claims, 2 Drawing Sheets

(56) References Cited

U.S. PATENT DOCUMENTS

| | | | | |
|---|---|---|---|---|
| 7,827,924 B1* | 11/2010 | Perez | ................. | B63B 21/00 |
| | | | | 114/230.15 |
| 8,091,499 B1* | 1/2012 | Perez | ................. | B63B 21/00 |
| | | | | 114/218 |
| 8,544,401 B2* | 10/2013 | Arote | ................. | E02B 3/24 |
| | | | | 114/218 |
| 8,857,359 B1* | 10/2014 | Gonzalez | ................. | B63B 21/00 |
| | | | | 114/230.15 |
| 9,266,584 B2* | 2/2016 | White | ................. | B63B 21/04 |
| 9,415,839 B2* | 8/2016 | Todd | ................. | B63B 21/045 |
| 2008/0105800 A1* | 5/2008 | Menning | ................. | B63B 23/62 |
| | | | | 248/200 |
| 2009/0083947 A1* | 4/2009 | Kubli | ................. | B63B 21/04 |
| | | | | 24/115 H |
| 2015/0343889 A1* | 12/2015 | Hissong | ................. | B60J 11/04 |
| | | | | 150/166 |
| 2017/0259726 A1* | 9/2017 | Milby | ................. | B60P 7/0807 |
| 2017/0297658 A1* | 10/2017 | Mullikin | ................. | B63B 21/20 |

* cited by examiner

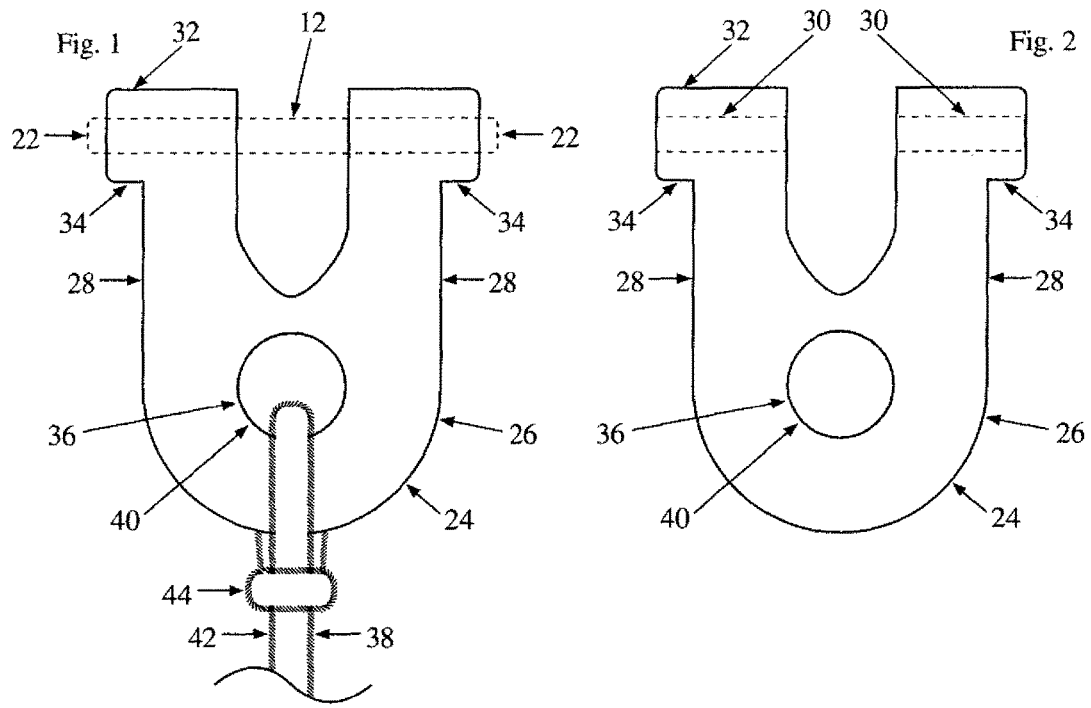
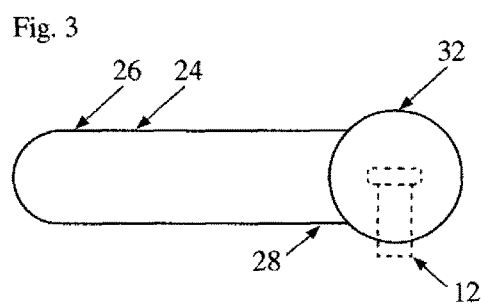
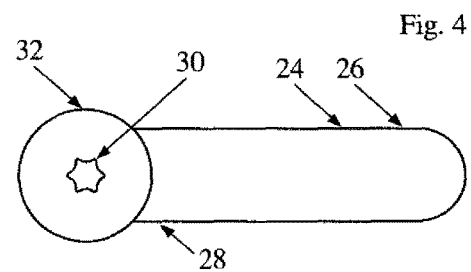
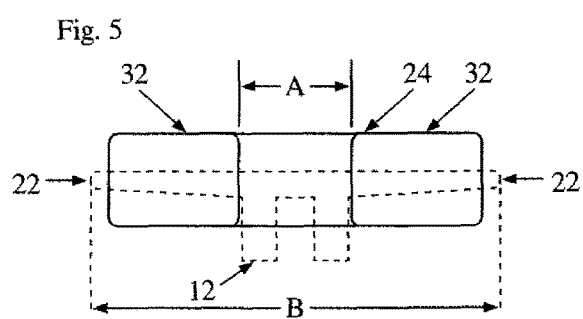
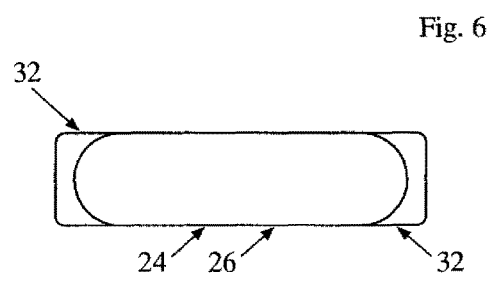

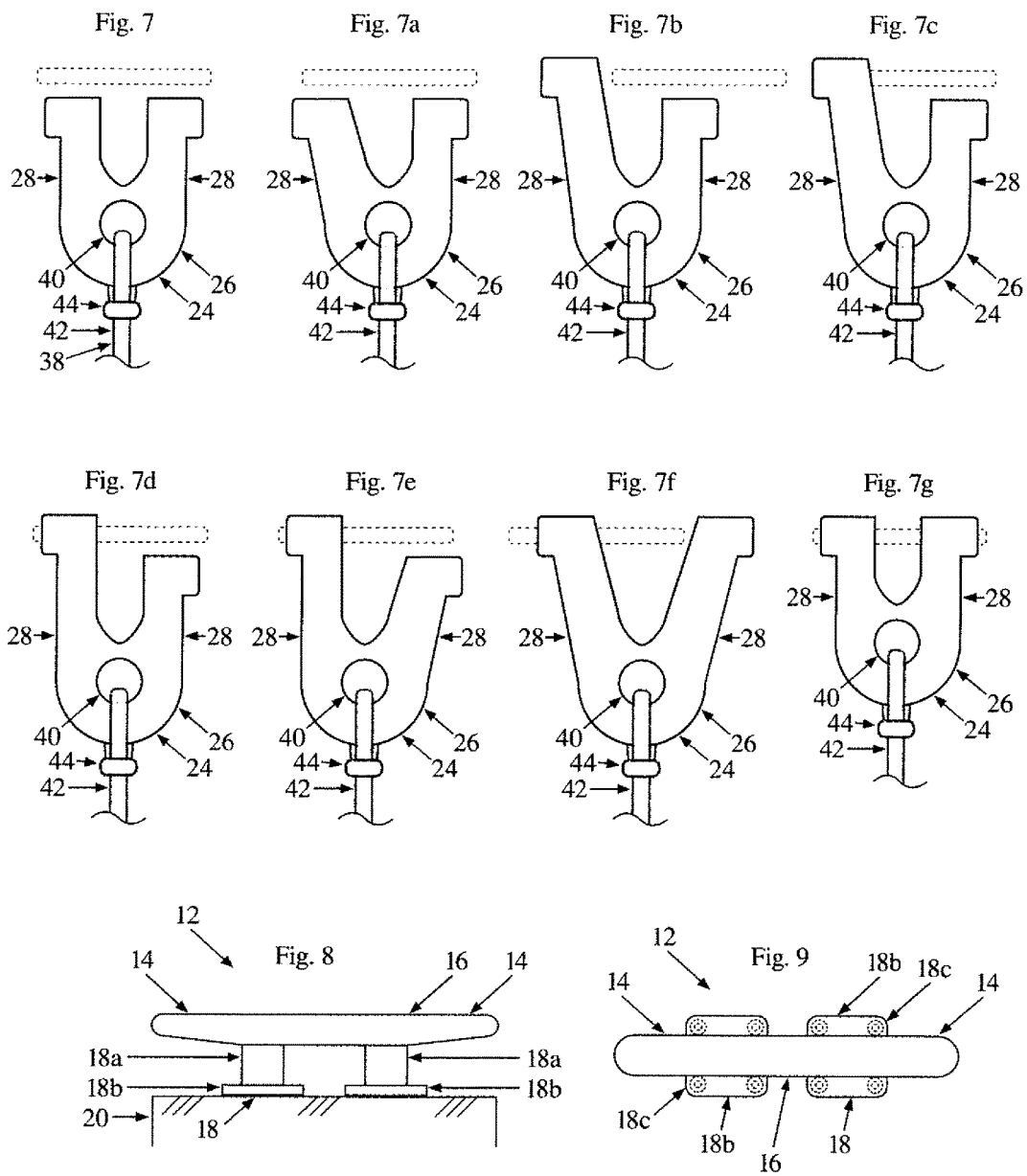

METHOD AND DEVICE FOR CONNECTING ARTICLES TO TIE-DOWN CLEATS

CROSS-REFERENCE TO RELATED APPLICATIONS

This application claims the priority benefit of U.S. Provisional Patent Application No. 62/328,059 filed on Apr. 27, 2016, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The present invention generally relates to a method and device for connecting ropes, straps, bungee cords, netting, covers, wraps, accessories, and other articles to tie-down cleats. More specifically, the present invention relates to connections to tie-down or horn cleats typically found on boats, boat docks, trucks, truck and trailer beds, recreational vehicles (RVs), motorcycles, 3-wheel and 4-wheel all-terrain vehicles (ATVs), wave runners, utility vehicles, and the like.

BACKGROUND OF THE INVENTION

Most boats and docks are provided with specific fixtures which enable you to tie the boat to the dock so that the boat does not float away. One of the most common fixtures is a tie-down or horn cleat or which is typically shaped like a very wide and short capital letter T. Such tie-down cleats are also often used in other applications such as, for example, for securing covers, cargo, loads etc. to trucks, truck beds and trailers, recreational vehicles (RVs), motorcycles, 3-wheel and 4-wheel all-terrain vehicles (ATVs), wave runners, utility vehicles, other vehicles, and the like. Tie-down cleats typically have a top or horizontal portion that provides a pair of oppositely-extending horns and a bottom or vertical portion which spaces the top portion above a mounting surface. Tie-down cleats can be either a closed-type having a bottom portion in the form of a solid base or an open-type having a bottom portion in the form of two closely spaced support legs or a single base with at least one opening therein so that rope or the like can be passed through the base. The most common methods for connecting a rope or the like to a tie-down cleat is: (1) tying an open or free end of the rope or the like around the tie-down cleat with a hitch or other suitable knot; (2) looping a spliced eye/loop end of the rope or the like over the tie-down cleat or passing the loop through the base and then over the horns if an open-type cleat; and (3) hooking a hook attached to the end of the rope or the like onto the tie-down cleat.

With boats, tying up ropes often requires some knowledge or expertise in tying knots in order to obtain a desirable connection with boat cleats and dock cleats. The same can be true for tie-down cleats on trucks and truck beds used for securing loads. Even if a rope has a pre-spliced eye that is meant to loop around a cleat, people not familiar with tying up ropes struggle with the correct way to secure the ropes to the tie-down cleats—even experienced people can struggle with this. This can be a hazard when boats are not properly secured in waterways; or when trucks travel on public roadways with loads not properly secured. Additionally, this typically causes delays with docking boats; or loading and unloading trucks. Furthermore, maneuvering lines that are tightly wrapped around cleats can create dangers for people, with potential for injured fingers and hands, etc.

There are a variety of prior devices used in conjunction with connecting boats to the tie-down cleats. Examples include: (1) ropes that are open ended, or pre-spliced with an eye/loop at one or both ends; (2) bungee or shock cord adapted specifically for tying up boats to docks temporarily/short-term, specifically a 4-5 ft. bungee or shock cord with an eye/loop formed at each end for wrapping around the tie-down cleats; and (3) boat fender systems for docking boats, specifically a 2 ft-long rubber-like bumper with a loop at each end for wrapping around the tie-down cleats. These prior devices all basically offer the same solution in a slightly different form: a rope/strap/device with a loop at each end that wraps around the tie-down cleats. There is nothing specifically unique with these prior devices and methods as far as how they connect to the tie-down cleats.

There are also a variety of prior devices used in conjunction with securing loads on trucks and truck and trailer beds using the tie-down cleats. Examples include: (1) ropes that tie around the tie-down cleats; (2) bungee cords/shock cords with hooks at each end that hook onto the tie-down cleats; and (3) adjustable-length straps with hooks at the ends that hook onto the tic-down cleats. Again, there is nothing specifically unique with these prior devices and methods as far as how they connect to the tie-down cleats.

There are also prior art devices that hook other articles to the tie-down cleats on boats and/or docks. For example, some prior fishing rod holders and rod holder bases can be secured onto tie-down cleats by hooking a metal hook around the tie-down cleat. These prior devices and methods can be effective but can be difficult and hazardous. Also, they often require additional attachments, expert knowledge, tools, or extra muscular strength for making these connections.

Accordingly there exists a need for a method and device for attaching articles to tie-down or horn cleats that is simple, easy, fast, secure and safe for anyone, without requiring additional attachments, expert knowledge, tools, or extra muscular strength for connecting.

SUMMARY OF THE INVENTION

Disclosed is a method and device for connecting ropes, straps, bungee cords, netting, covers, wraps, accessories, or any other articles to tie-down cleats that overcome at last some of the disadvantages of the above-described prior art. Disclosed is a device for removably connecting an article to a tie-down cleat having a pair of opposed horns each with a free end, the device comprises, in combination, a body having a pair of horn openings each configured for receiving one of the opposed horns therein. The horn openings are spaced apart a distance less than a distance between the free ends of the horns. At least a portion of the body comprises an elastic material so that the body can be resiliently stretched for selectively inserting the opposed horns into the horn openings to secure the body to the tie-down cleat and resiliently stretched for selectively removing the opposed horns out of the horn openings to remove the body from the tie-down cleat Also disclosed is a device for removably connecting a rope to a tie-down cleat having a pair of opposed horns each with a free end. The device comprises, in combination, a body having a main portion and a pair of spaced-apart leg portions extending from the main portion. Each of the leg portions has a horn opening for receiving one of the opposed horns therein. At least the leg portions each comprise an elastic material so that the leg portions can be resiliently stretched for selectively inserting the opposed horns into the horn openings to secure the body to the tie-down cleat and resiliently stretched for selectively removing the opposed horns from the horn openings to remove the body from the tie-down cleat. The main portion has an attachment configured for securing the article to the main portion.

Further disclosed is a method for removably connecting an article to a tie-down cleat having a pair of opposed horns each with a free end. The method comprises the steps of, in combination, obtaining a cleat connector having a body including a pair of horn openings each configured for receiving one of the opposed horns therein, resiliently stretching the body to place the free end of a first one of the horns into a first one of the horn openings, and resiliently stretching the body to place the free end of a second one of the horns into a second one of the horn openings. At least a portion of the body comprises an elastic material.

From the foregoing disclosure and the following more detailed description of various preferred embodiments it will be apparent to those skilled in the art that the present invention provides a significant advance in the technology and art of a method and device for attaching articles to tie-down cleats. Particularly significant in this regard is the potential the invention affords for a simple and effective method and device. Additional features and advantages of various preferred embodiments will be better understood in view of the detailed description provided below.

BRIEF DESCRIPTION OF THE DRAWINGS

These and further features and advantages of the present invention will become readily appreciated as the same becomes better understood by reference to the following description when considered in connection with the accompanying drawings.

FIG. 1 is a top view of a cleat connector according to the present invention showing the cleat connector connected to a tie-down cleat, with the tie-down cleat represented in dashed line, wherein the cleat connector has two opposing leg portions each with a horn openings receiving one of the horns of the tie-down cleat, and a rope opening with a rope secured to the cleat connector through the rope opening.

FIG. 2 is a bottom view of the cleat connector of FIG. 1, wherein the tie-down cleat and the rope have been removed for clarity.

FIG. 3 is a right side view of the cleat connector of FIGS. 1 and 2, wherein the cleat connector is connected to the tie-down cleat, with the cleat represented in dashed line, and the right horn of the tie-down cleat is extending through the right horn opening.

FIG. 4 is a left side view of the cleat connector of FIGS. 1 to 3, wherein the tic-down cleat and the rope have been removed for clarity.

FIG. 5 is a front view of the cleat connector of FIGS. 1 to 4, wherein the cleat connector is connected to the tie-down cleat, with the cleat represented in dashed line, and the horns of the tie-down cleat are extending through the horn openings.

FIG. 6 is a rear view of the cleat connector of FIGS. 1 to 5, wherein the tie-down cleat and the rope have been removed for clarity.

FIG. 7 is a top view of the cleat connector of FIGS. 1 to 6 located next to the tie-down cleat but not yet connected to the tie-down cleat.

FIG. 7a shows the cleat connector of FIG. 7 with the left side or leg portion starting to be extended toward the left horn of the tie-down cleat.

FIG. 7b shows the cleat connector of FIG. 7a with the left side or leg portion further extended to the free end of the left horn of the tie-down cleat.

FIG. 7c shows the cleat connector of FIG. 7b with the left side or leg portion sliding onto the left horn of the tie-down cleat.

FIG. 7d shows the cleat connector of FIG. 7c with the left side or leg portion connected onto the left horn of the tie-down cleat.

FIG. 7e shows the cleat connector of FIG. 7d with the left side or leg portion connected onto the left horn and the right side or leg portion starting to be extended toward the right horn of the tie-down cleat.

FIG. 7f shows the cleat connector of FIG. 7e with the left side or leg portion connected onto the left horn and the right side or leg portion further extended to the free end of the right horn of the tie-down cleat.

FIG. 7g shows the cleat connector of FIG. 7f with both sides or legs portions connected onto the tie-down cleat and released so that the sides or leg portions are not resiliently extended.

FIG. 8 is a front view of a typical tie-down cleat.

FIG. 9 is a top view of the tie-down cleat of FIG. 8.

It should be understood that the appended drawings are not necessarily to scale, presenting a somewhat simplified representation of various preferred features illustrative of the basic principles of the invention. The specific design features of the cleat connectors disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the mobile storage systems illustrated in the drawings. In general, up or upward refers to an upward direction generally out of the plane of the paper in FIG. 1 and down or downward refers to a downward direction generally into the plane of the paper in FIG. 1. Also in general, forward or front refers to a direction extending upward within the plane of the paper in FIG. 1 and back or rear refers to a direction extending downward within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the method and device for connecting ropes, straps, bungee cords, netting, covers, wraps, accessories, or any other articles to tie-down cleats disclosed herein. The following detailed discussion of various alternative and preferred embodiments will illustrate the general principles of the invention with regard to the specific application of a cleat connector for securing a rope and the like to a tie-down cleat. Other embodiments suitable for other applications such as, for example, straps, bungee cords, netting, covers, wraps, accessories, or any other articles and the like will be apparent to those skilled in the art given the benefit of this disclosure.

FIGS. 1 to 6 illustrate a connection device or cleat connector 10 according to the present invention for removably connecting an article to a tie-down or horn cleat 12 having a pair of opposed horns 14. FIGS. 8 and 9 illustrate an exemplary tie-down or horn cleat 12 having a main bar 16 forming a pair of the opposed horns 14 at free end portions of the main bar 16 and a base 18 located along the length of the main bar 16 and extending downward from the main bar 16 for securing the tie-down cleat 12 to a support surface 20 with the main bar 16 spaced-apart from the support surface 20. The illustrated base 18 is in the form of a pair of spaced-apart support legs 18a. The illustrated support legs 18a are each provided with an attachment plate 18b at its lower end. The illustrated attachment plates 18b have a plurality of fastener openings 18c so that the support plates 18b can easily be secured to a support surface with mechanical fasteners extending therethrough. It is noted that the base 18 can alternatively have any other suitable configuration such as, for example a solid block and the like. It is noted that each of the horns 14 extend outward from the base 18 in a cantilevered manner to have opposed free ends 22. It is noted that the tie-down or horn cleat 12 can alternatively have any other suitable configuration.

The illustrated cleat connector 10 includes a body 24 having a main portion 26 and a pair of parallel and spaced-apart leg portions 28 extending from the main portion 26 in the same direction in a cantilevered manner. Each of the leg portions 28 has a horn opening 30 extending therethrough for receiving one of the opposed horns 14 therein. The illustrated horn openings 30 are located near free ends of the leg portions 28 opposite the body portion 26. The illustrated horn openings 30 in the leg portions 28 are coaxial and spaced apart in the axial direction. The illustrated horn openings 30 are spaced apart a distance A less than a distance B between the free ends 22 of the horns 14 (best seen in FIG. 5) so that the cleat connecter 10 must be resiliently stretched or resiliently deformed in order to insert the horns 14 into the horn openings 30 and to remove the horns 14 from the horn openings 30. Thus, upon release of the cleat connector 10 with the horns 14 in the horn openings 30, the cleat connecter 10 resiliently returns to, or nearly thereto, its normal or natural un-deformed shape or form and is firmly connected to the tie-down cleat 12. The free ends of the illustrated are provided with cylindrically-shaped end portions 32 which are coaxial with the horn openings 30 and perpendicular to the remainder of the leg portions 28. The illustrated end portions 32 have width larger the width of the remainder of the leg portions 28 to form a step 34 on the outer side of the leg portions 28

The illustrated horn openings 30 are through holes. That is, the illustrated horn openings 30 extend entirely through the end portions 32 of the leg portions 28 so that the horns 14 can extend entirely through the end portions 32 of the leg portions 28 when inserted into the horn openings 30. It is noted, however, that the horn openings 30 can alternatively be formed as blind holes or pockets inwardly facing towards one another so that the free ends 22 of the horns 14 are located within the leg portions 28 when inserted into the horn openings 30. The illustrated horn openings 30 have a cross sectional shape in the form of a six-pointed star having a maximum width less than the width of the horns 14 but any other suitable shape and/or size can alternatively be utilized. The illustrated horn openings 30 in the leg portions 28 are sized to provide interference fits with the horns 14 of the tie-down or horn cleat 12 so that the leg portions 28 grip the horns 14 when the opposed horns 14 are located within the horn openings 30 in the leg portions 28. For example, but not limited to, the horn openings 30 can alternatively have more or fewer star points depending on the size and shape of the horns 14, and/or have a different shape such as round, square, rectangular, triangular etc. depending on the size and shape of the horns 14. Also for example, but not limited to, the horn openings 30 can alternatively have other configurations such as provided with slits formed through their front sides and extending to the front outer surface at the free end of the leg portion 28 so that the horns 14 can be resiliently pushed into and resiliently pulled out of the horn openings 30 through the slits by pushing the slits of the cleat connector 10 toward the horns 14 in a direction that is perpendicular to the longitudinal axis of the horns 14. It is noted that the cleat connector 10 can alternatively have any other suitable configuration.

The illustrated body 24 comprises an elastic material such as natural or synthetic rubber, silicone, and the like so that the leg portions 28 can be resiliently deformed to be placed onto the opposed horns 14 and resiliently deformed to be removed from the opposed horns 14 by resiliently stretching one or both of the leg portions 28. It is noted that rather than forming the entire body 24 of the elastic material, alternatively the main portion 26 can comprise a non-elastic material and the leg portions 28 each comprise the elastic material. Such an alternative embodiment can be co-molded if desired.

The illustrated main portion 26 has an attachment 36 for securing the article 38 to the main portion 26 that is desired to be secured to the tie-down cleat 12. The illustrated attachment 36 is configured for connecting a rope 42 and the like to the tie-down or horn cleat 12. The illustrated attachment 36 is an opening 40 extending entirely through the main portion 26 and sized and shaped so that the rope 42 can be passed therethrough. The illustrated rope 42 is passed through the opening 40 and secured with a sleeve 44 to form a loop which secures the rope 42 to the main portion 26 of the cleat connector 10. It is noted that the rope 42 can be secured to the cleat connector 10 in any other suitable manner. The illustrated attachment opening 40 in the main portion 26 is perpendicular to the horn openings 30 in the leg portions 28 but it is noted that the attachment opening 40 can alternatively have any other configuration such as, for example, parallel with the horn openings 30. It is noted that the attachment 36 on the main portion 26 can alternatively be configured in any other suitable manner for attachment of the rope 42 and/or can be configured for attachment of any other suitable article 38 such as, for example, straps, bungee cords, netting, covers, wraps, accessories, and like articles.

FIGS. 7 to 7g illustrate a method according to the present invention for removably connecting an article 38 to a tie-down or horn cleat 12 using the above-described cleat connector 10. First a cleat connector 10 is obtained. Next, a first one of the leg portions 28 is placed over a free end 22 of a first one of the horns 14 so that the first one of the horns 14 extends into the horn opening 30 in the first one of the leg portions 28. This is performed by resiliently stretching the first one of the leg portions 28 so that its horn opening 30 is outward of the end of the first one of the horns 14 and aligned with the free end of the first one of horns 14. The first one of the leg portions 28 is then moved over the free end 22 of the first one of the horns until the horn 14 extends into the horn opening 30. In the illustrated embodiment, the horn 14 extends entirely through the first horn opening 30 which extends entirely through the first leg portion 28. Next, a second one of the leg portions 28 is placed over a free end 22 of a second one of the horns 14 so that the second one of the horns 14 extends into the horn opening 30 in the second one of the leg portions 28. This is performed by resiliently stretching the second one of the leg portions 28 so that its horn opening 30 is outward of the free end 22 of the second one of the horns 14 and aligned with the free end 22 of the second one of horns 14. The second one of the leg portions 28 is then moved over the free end 22 of the second one of the horns 14 until the horn 14 extends into the horn opening 30. In the illustrated embodiment, the second one of horns 14 extends entirely through the second horn opening 30 which extends entirely through the second leg portion 28. Once released, the cleat connector 10 elastically returns to, or near to, its free or un-stretched form (best shown in FIG. 7*g*). It is noted that while the above-described method describes the leg portions 28 being secured to the horns in sequence, if desired, the leg portions 28 can alternatively be simultaneously secured at the same time if desired.

Any of the features or attributes of the above-described embodiments and variations can be used in combination with any of the other features and attributes of the above-described embodiments and variations as desired.

It should be appreciated from the above-description, that the present invention provides a method and device for removably connecting articles to tie-down or horn cleats that can be quickly and easily attached to the tie-down cleat to secure the article to the tie-down cleat and also can be just as quickly and easily removed from the tie-down cleat to disconnect the article from the tie-down cleat. Thus the method and device provide efficient and nearly effortless secure connections and eliminate delays caused by tying or untying rope, securing or unsecuring straps, struggling to disconnect ropes or hooks when they are under tension, etc. It should also be appreciated that because the connection device comprises an elastic material, the connection device provides protection from sudden jolts, absorbs shock, and compensates for excess tension on cleats. Additionally, it should be appreciated that multiple sizes of the connection device can be provided based on tie-down cleat sizes, load sizes, sizes of the bodies to which the tie-down cleats are to be attached, and the size and/or type of article to be attached to the tie-down cleat by the connection device. The method and device of the present invention overcome the shortcomings and disadvantages found in the prior art by providing a universal cleat connector that is simple, portable, durable, and does not require additional attachments or fasteners, expert knowledge, tools, or muscular strength for connecting.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A device for removably connecting an article to a tie-down cleat having a pair of opposed horns each with a free end, the device comprising, in combination:
   a body having a pair of horn openings each configured for receiving one of the opposed horns therein;
   wherein the horn openings are co-axial and spaced apart in an axial direction a distance less than a distance between the free ends of the horns;
   wherein horn openings are through holes configured so that the horns extend entirely through the horn openings;
   wherein the body has an attachment configured for directly securing the article to the body; and
   wherein at least a portion of the body comprises an elastic material so that the body can be resiliently stretched for selectively inserting the opposed horns into the horn openings to secure the body to the tie-down cleat and resiliently stretched for selectively removing the opposed horns out of the horn openings to remove the body from the tie-down cleat.

2. The device according to claim 1, wherein the horn openings are each sized with a width less than a width of the horns to provide interference fits with the horns so that the body grips the horns when the opposed horns are located within the horn openings.

3. The device according to claim 1, wherein the entire body comprises the resiliently elastic material.

4. The device according to claim 1, wherein the attachment is an attachment opening extending through the body.

5. The device according to claim 1, wherein the horn openings are star-shaped in cross-section.

6. A device for removably connecting a rope to a tie-down cleat having a pair of opposed horns each with a free end, the device comprising, in combination:
   a body having a main portion and a pair of spaced-apart leg portions extending from the main portion;
   wherein each of the leg portions has a horn opening for receiving one of the opposed horns therein;
   wherein the horn openings are co-axial and spaced apart in an axial direction;
   wherein horn openings are through holes configured so that the horns extend entirely through the horn openings;
   wherein at least the leg portions each comprise an elastic material so that the leg portions can be resiliently stretched for selectively inserting the opposed horns into the horn openings to secure the body to the tie-down cleat and resiliently stretched for selectively removing the opposed horns from the horn openings to remove the body from the tie-down cleat; and
   wherein the main portion of the body has an attachment configured for directly securing the rope to the main portion of the body.

7. The device according to claim 6, wherein the horn openings are spaced apart in the axial direction a distance less than a distance between the free ends of the horns.

8. The device according to claim 6, wherein the horn openings are each sized with a width less than a width of the horns to provide interference fits with the horns so that the leg portions grip the horns when the opposed horns are within the horn openings.

9. The apparatus according to claim 6, wherein the entire body comprises the resiliently elastic material.

10. The device according to claim 6, wherein the horn openings are star-shaped in cross-section.

11. The device according to claim 6, wherein the attachment is an attachment opening extending through the main portion of the body.

12. A method for removably connecting an article to a tie-down cleat having a pair of opposed horns each with a free end, the method comprising the steps of, in combination:
    obtaining a cleat connector having a body including a pair of horn openings each configured for receiving one of the opposed horns therein;
    wherein the body has an attachment directly securing the article to the body;
    wherein the horn openings are co-axial and spaced apart in the axial direction;
    wherein horn openings are through holes configured so that the horns extend entirely through the horn openings;
    wherein at least a portion of the body comprises an elastic material;
    resiliently stretching the body to place the free end of a first one of the horns into a first one of the horn openings; and
    resiliently stretching the body to place the free end of a second one of the horns into a second one of the horn openings.

13. The method according to claim 12, wherein the body is stretched to simultaneously place both the free ends of the horns into the horn openings.

14. The method according to claim 12, wherein the horn openings are spaced apart in the axial direction a distance less than a distance between the free ends of the horns.

15. The method according to claim 12, wherein the horn openings are each sized with a width less than a width of the horns to provide interference fits with the horns so that the body grips the horns when the opposed horns are located within the horn openings.

16. The method according to claim 12, wherein the entire body comprises the resiliently elastic material.

17. The method according to claim 12, wherein the attachment is an attachment opening extending through the body.

18. The method according to claim 17, wherein the article is a rope and the attachment opening is configured for attachment of the rope to the body.

19. The method according to claim 12, further comprising the step of resiliently stretching the body while removing the horns from the horn openings.

20. The method according to claim 12, wherein the horn openings are star-shaped in cross-section.

* * * * *